United States Patent
Wang et al.

(10) Patent No.: US 9,272,698 B2
(45) Date of Patent: Mar. 1, 2016

(54) STOPPING A HYBRID ENGINE WITH ENGINE START ANTICIPATION

(71) Applicant: FORD GLOBAL TECHNOLOGIES, LLC, Dearborn, MI (US)

(72) Inventors: Xiaoyong Wang, Novi, MI (US); Wei Liang, Farmington Hills, MI (US); Francis T. Connolly, Ann Arbor, MI (US); Ming L. Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 56 days.

(21) Appl. No.: 14/208,305

(22) Filed: Mar. 13, 2014

(65) Prior Publication Data

US 2015/0258974 A1    Sep. 17, 2015

(51) Int. Cl.
*B60W 10/02* (2006.01)
*B60W 10/06* (2006.01)
*B60W 10/08* (2006.01)

(52) U.S. Cl.
CPC .............. *B60W 10/06* (2013.01); *B60W 10/02* (2013.01); *B60W 10/08* (2013.01); *B60W 2710/0644* (2013.01); *Y10S 903/902* (2013.01); *Y10T 477/26* (2015.01)

(58) Field of Classification Search
CPC .................................................. B60W 2710/02
See application file for complete search history.

(56) References Cited

U.S. PATENT DOCUMENTS

| | | | |
|---|---|---|---|
| 8,112,208 B2 | 2/2012 | McGee et al. | |
| 8,370,051 B2 | 2/2013 | Pursifull et al. | |
| 2008/0071437 A1* | 3/2008 | Hirata et al. | 701/22 |
| 2010/0305820 A1* | 12/2010 | McGee et al. | 701/54 |
| 2011/0136622 A1* | 6/2011 | Enoki | 477/83 |
| 2013/0012355 A1 | 1/2013 | Yamazaki et al. | |
| 2013/0211654 A1* | 8/2013 | Tanisshima et al. | 701/22 |

FOREIGN PATENT DOCUMENTS

WO    2011039026 A2    4/2011

* cited by examiner

*Primary Examiner* — Sherry Estremsky
*Assistant Examiner* — Lillian Nguyen
(74) *Attorney, Agent, or Firm* — David B. Kelley; MacMillan, Sobanski & Todd, LLC

(57) ABSTRACT

A hybrid electric automotive powertrain includes an engine start/stop system to improve fuel economy. The stop routine provides for quick restarting to avoid delay in a driver change of mind case. The stop routine may be terminated prior to full engine stop when a torque request is received during the stop routine.

18 Claims, 4 Drawing Sheets

STOPPING A HYBRID ENGINE WITH ENGINE START ANTICIPATION

BACKGROUND OF INVENTION

The present invention relates to a method of controlling an automotive engine and in particular to a method of stopping a parallel hybrid engine while anticipating restarting the engine.

Automotive vehicle powertrains incorporate engine start/stop (ESS) systems to improve fuel economy. ESS stops an internal combustion engine under specified conditions when engine torque is not required and restarts the engine when torque is again required. For example, ESS may stop the engine of a vehicle after a driver brakes the vehicle to a stop at a traffic light and then restart the engine when the driver requests torque by depressing an accelerator pedal when the traffic light changes. ESS is commonly incorporated into hybrid electric powertrains. The more conditions specified when ESS stops the vehicle engine, the greater the potential improvement to fuel economy.

However, restarting an ESS stopped engine has a time delay. This delay may decrease the drivability of the vehicle. The delay may be more pronounced when the driver requests torque while the engine is still in the process of being stopped. Under certain scenarios the engine may be controlled to complete its stop routine before commencing its restart routine.

SUMMARY OF INVENTION

An embodiment contemplates a method of controlling a hybrid vehicle engine. Torque is reduced in an engine as a clutch interposed between the engine and an electric machine remains engaged. The clutch is disengaged before powering the engine at a speed synchronized to a speed of the machine. The engine is slowed from the synchronized speed to an idle speed while the clutch remains disengaged. Upon reaching the idle speed, the engine is stopped before later being restarted.

Another embodiment contemplates a method of controlling a hybrid vehicle engine. Torque is reduced in an engine as a clutch interposed between the engine and an electric machine remains engaged, the reduced torque being maintained for a first duration. After the first duration, and without stopping rotation of the engine, the clutch is disengaged and the engine powered for a second duration at a speed synchronized to a speed of the machine. After the second duration, the engine is slowed from the synchronization speed to an idle speed while continuing to rotate the engine with the clutch disengaged, the idle speed being maintained for a third duration. The engine is stopped after the third duration before later being restarted.

Another embodiment contemplates a method of controlling a hybrid vehicle engine. The engine is unpowered by reducing torque in the engine as a clutch interposed between the engine and an electric machine remains engaged, without stopping rotation of the engine disengaging the clutch before powering the engine at a speed synchronized to a speed of the machine, slowing and continuing to rotate the engine from the synchronized speed to an idle speed while the clutch remains disengaged, and stopping the engine upon reaching the idle speed. Repowering the unpowered and stopped engine by restarting and accelerating the stopped engine with the clutch disengaged, reengaging the clutch once the restarted engine reaches the synchronized speed, and providing torque from the restarted engine via the reengaged clutch to a powertrain.

An advantage of an embodiment is that the method of controlling a hybrid vehicle engine will allow an engine stop routine to be terminated and an engine restart routine to be commenced before the stop routine is complete. This will reduce delay in the engine delivering torque when torque is requested during the engine stop routine.

DETAILED DESCRIPTION

Figure 1:
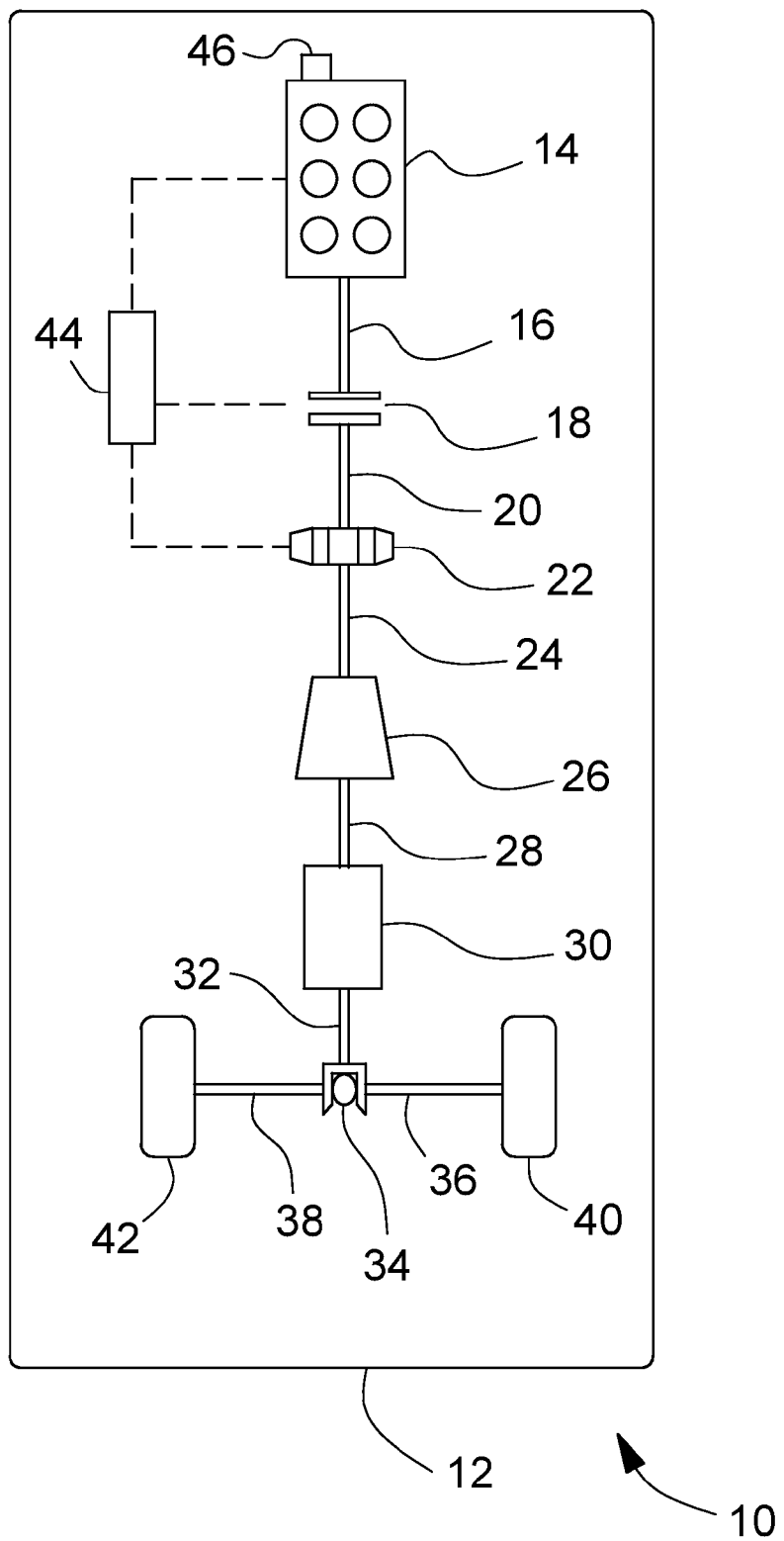
FIG. 1 is a schematic view of a hybrid electric powertrain.

FIG. 1 schematically illustrates a hybrid electric powertrain 10 for an automotive vehicle 12.

The powertrain 10 includes an internal combustion engine 14 powering a crankshaft 16. Interposed between the engine 14 and an electric machine 22, which may be an electric motor or motor/generator, is a clutch 18. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. The transmission 30 turns a driveshaft 32 which in turn drives a differential 34. The differential 34 transmits torque to a first and second axle 36 and 38, respectively, which drive first and second wheels 40 and 42, respectively. Operation of the engine 14, clutch 18, and machine 22 is controlled by one or more controllers 44. The engine 14 is connected to a starter 46.

Figure 2A:
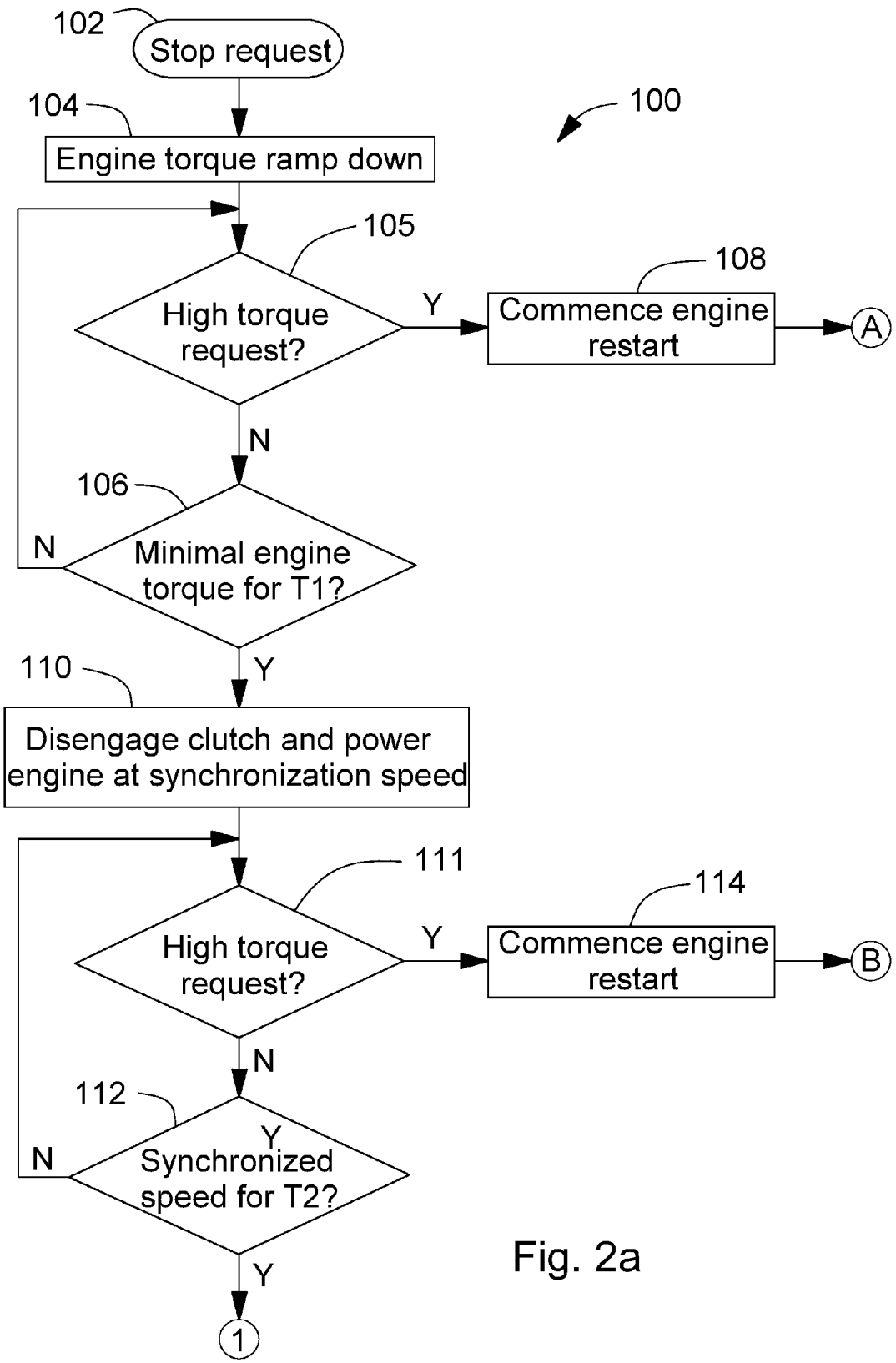
FIGS. 2a and 2b show a flow chart of an engine stop routine.
Figure 2B:
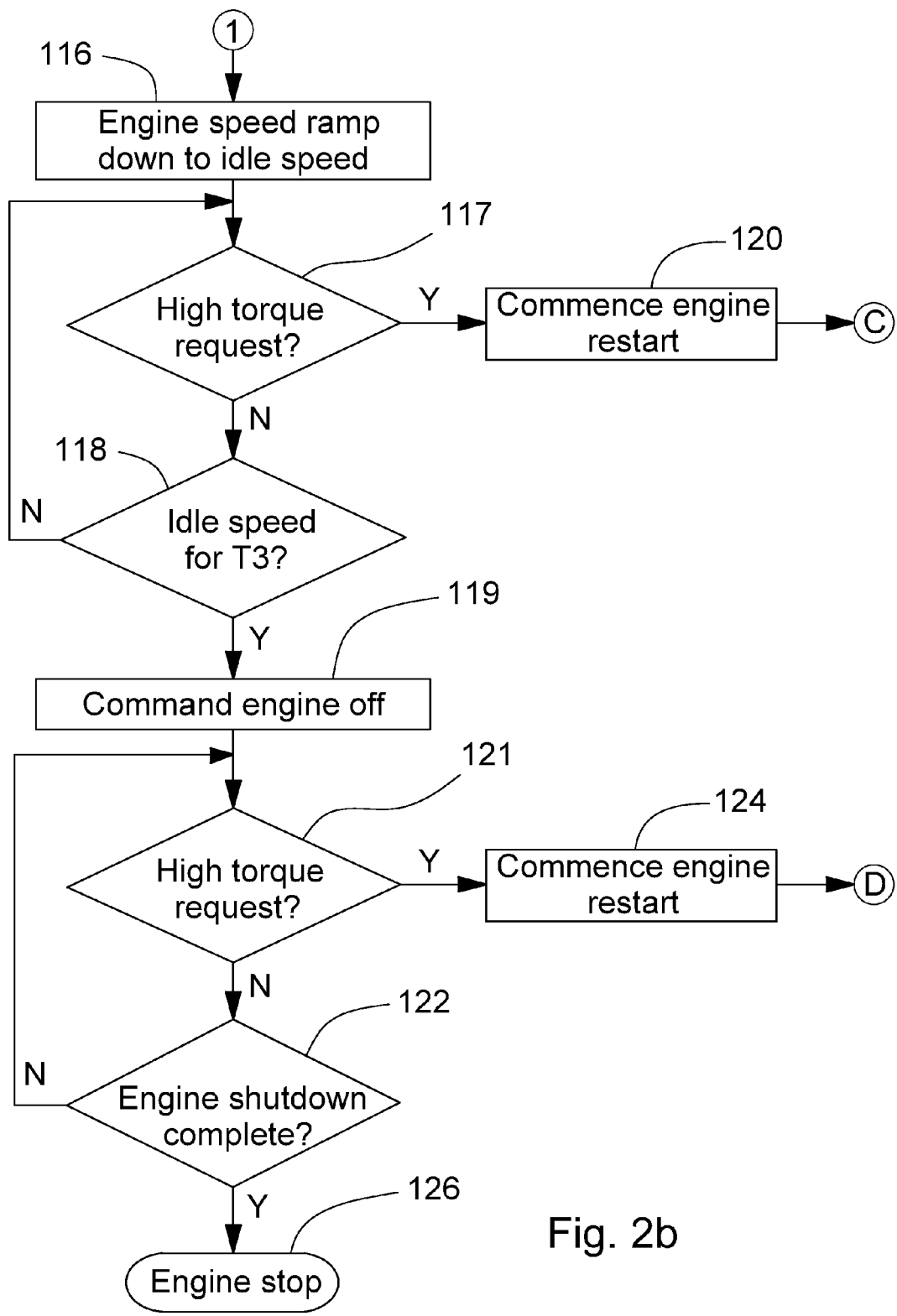

FIGS. 2a-2b will now be discussed with reference to FIG. 1. FIGS. 2a-2b illustrate a stop routine 100 for the internal combustion engine 14. First, in a step 102, a stop request for the engine 14 is made to the controller 44, or the controller 44 determines that the stop request is appropriate to be made for the engine 14. For example, when a driver releases an accelerator pedal the engine 14 might be requested to stop, or the controller may determine the stop request is appropriate as a result of an adaptive cruise control system signal. At the time the stop request is made, the engine 14 is already running and providing torque to the powertrain 10 via the engaged clutch 18. In a step 104, the controller 44 ramps down torque in the engine 14 by gradually taking out the brake torque of the engine 14. This results in the clutch 18 transmitting a minimal amount of torque to the powertrain 10. The minimal amount of torque is an amount of torque at which it is possible to disengage the clutch 18 without damaging the clutch 18 or producing undesirable noise, vibration, or harshness in the vehicle 12.

Next, in a step 105, the controller 44 determines if a high torque request has been made. The high torque request is a torque request greater than a torque threshold. Above the torque threshold the controller 44 determines that the torque request should be met, at least partly, by the engine 14. Below the torque threshold the controller 44 determines that the torque request should be met by the machine 22 without the engine 14. The torque threshold is a function of a current speed of the vehicle, a state of charge of the battery, and a power discharge limit of the battery. If the controller 44 receives the high torque request during the engine stop routine 100 before a step 106, an engine restart request is made, the engine stop routine 100 terminates, and an engine restart routine 200 (illustrated in FIG. 3) commences at a step 108.

If a high torque request is not made at step 105, then in step 106, the engine 14 is maintained producing the minimal amount of torque for a first calibratable duration T1. For example, the first duration T1 may be a minimum time duration sufficient to measure and assure that the torque produced by the engine 14 has fallen to the minimal amount of torque. By keeping the clutch 18 engaged while the engine 14 provides the minimal amount of torque, the powertrain 10 may readily respond to the torque request, for example, when the driver quickly changes his or her mind from first not requesting torque to again requesting torque. Such a scenario is a driver change of mind case. For example, the driver change of mind case may occur when the stop routine 100 commences after the driver releases the accelerator pedal but, before the stop routine 100 has completed, the driver makes the torque request by pressing the accelerator pedal again.

If the minimal amount of torque is not maintained for the first duration T1, then the step 105 is repeated. Otherwise, in a step 110, after the first duration T1 is satisfied, the clutch 18 is disengaged and the engine 14 is powered at a speed synchronized to a speed of the machine 22. In a step 111, the controller 44 determines if the high torque request is made after the step 110 but before a step 112. If the high torque request is made after the step 110 but before the step 112, then the engine restart request is made, the engine stop routine 100 terminates, and the engine restart routine 200 (illustrated in FIG. 3) commences at a step 114.

In the step 112, the engine 14 is held at the synchronized speed for a second calibratable duration T2 while the clutch 18 remains disengaged. Holding the engine 14 at the synchronized speed for the second duration T2 allows the engine 14 to more quickly respond to the torque request. The second duration T2 is calibrated based upon attributes of the vehicle and fuel economy objectives. By synchronizing the speed of the engine 14 to the machine 22, the clutch 18 may be readily reengaged. Consequently, there is no need to change the speed of the engine 14 to match the speed of the machine 22 before reengaging the clutch 18. For example, holding the engine at the synchronized speed in the step 112 for a second duration T2 avoids delay in supplying torque during the driver change of mind case. If the controller 44 receives the high torque request during the engine stop routine 100 after the step 110 and before a step 112, the engine stop routine 100 terminates and the engine restart routine 200 commences at a step 114.

If the synchronization speed is not maintained for the second duration T2, then the step 111 is repeated. Otherwise, in the step 116, after the second duration T2 is satisfied, the engine 14 is ramped down from the synchronized speed to an idle speed. In a step 117, the controller 44 determines if the high torque request is made after the step 116 but before a step 118. If the high torque request is made after the step 116 but before the step 118, then the engine restart request is made, the engine stop routine 100 terminates, and the engine restart routine 200 (illustrated in FIG. 3) commences at a step 120.

In the step 118, the engine 14 is held at the idle speed for a third calibratable duration T3 while the clutch remains disengaged. Holding the engine 14 at the synchronized speed for the third duration T3 allows the engine 14 to more quickly respond to the torque request. The third duration T3 is calibrated based upon attributes of the vehicle and fuel economy objectives. Maintaining the engine 14 at an idle speed for the third duration T3 has the benefit of addressing the driver change of mind case by avoiding the delay in supplying torque resulting from a full restart of the engine as well as keeping the engine warm for other purposes.

If the idle speed is not maintained for the third duration T3, then the step 117 is repeated. Otherwise, in the step 119, after the third duration T3 is satisfied, fuel supply and spark are ramped down for the engine 14—i.e., the engine 14 is commanded off. In a step 121, the controller 44 determines if the high torque request is made after the step 119 but before a step 122. If the high torque request is made after the step 119 but before the step 122, then the engine restart request is made, the engine stop routine terminates, and the engine restart routine 200 (illustrated in FIG. 3) commences at a step 124.

In the step 122, the controller 44 determines if the engine 14 is shutdown. If the engine 14 is not shutdown, then the step 121 is repeated. Otherwise, at a step 126, the engine stop routine 100 is complete.

Figure 3:
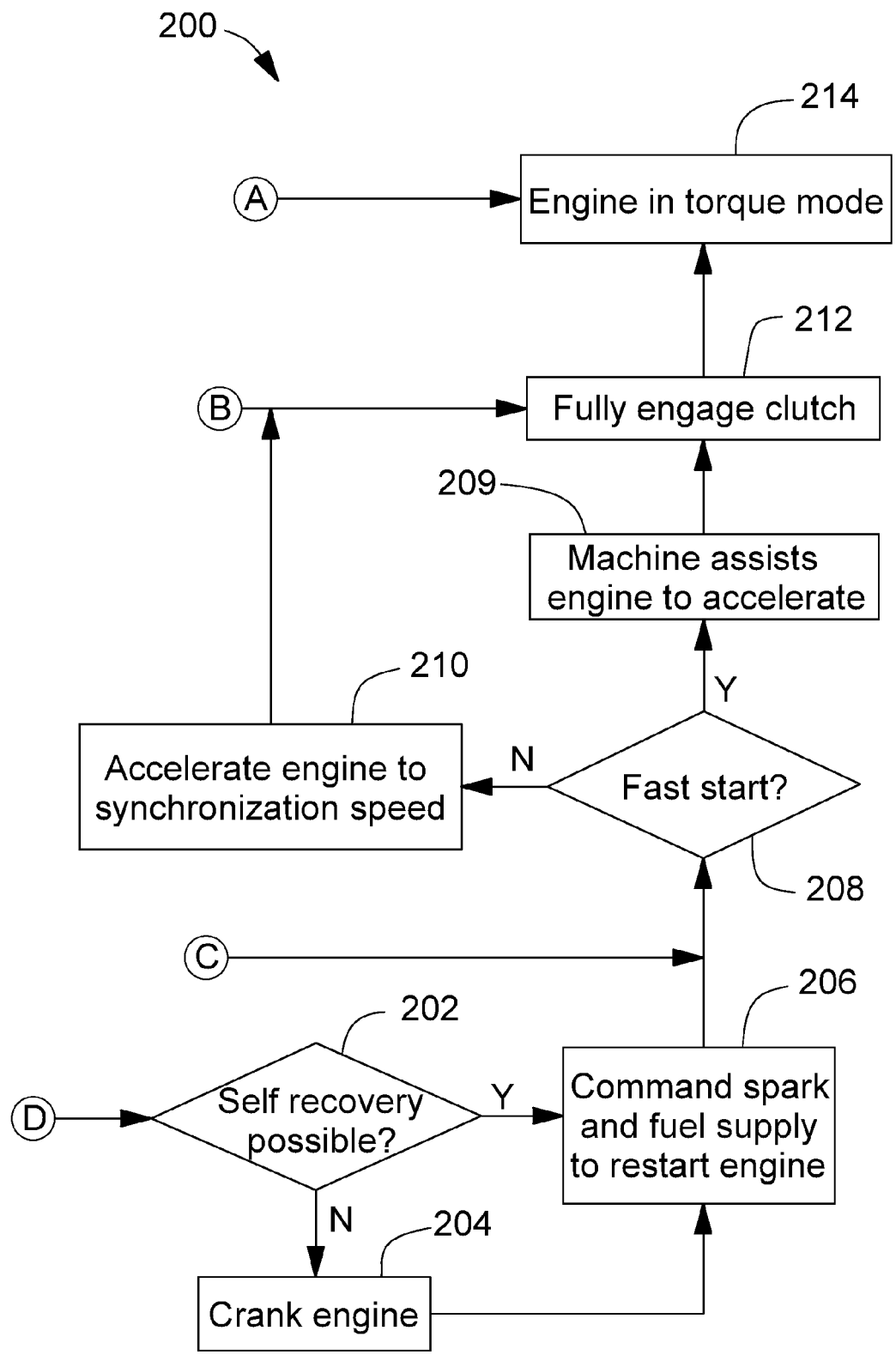
FIG. 3 is a flow chart of an engine restart routine, which may be employed to restart the engine after employing the engine stop routine of FIGS. 2a and 2b.

Referring now to FIG. 3, there is illustrated the engine restart routine 200 for the internal combustion engine 14, which will be discussed with reference to FIG. 1 and operates in conjunction with the process of FIGS. 2a-2b. Engine restart may occur as a result of the torque request by the driver or a determination by the controller 44. For example, the controller 44 may determine to restart the engine to recharge a high voltage battery. Or, for example, the controller 44 may determine to restart the engine due to operation of a climate control system. In a step 202, it is determined whether a self recovery restart of the engine 14 is possible. The self recovery restart is possible when fuel supply and spark for the engine 14 have been cutoff but the engine 14 is still rotating at a speed sufficient to allow it to be restarted by restoring fuel supply and spark without using the starter 46 to crank the engine 14. If self recovery restart is possible, then in a step 206 fuel supply and spark are restored to restart the engine. Otherwise, in a step 204, the engine is cranked by the starter 46 or the machine 22 via the disconnect clutch 18 while recommencing fuel supply and spark in the step 206.

In a step 208, it is determined whether a fast start is required. As understood by one skilled in the art, the fast start is required when the engine 14 must provide immediate torque. For example, the fast start is required when the driver makes a heavy tip-in of the accelerator. The fast start in a step 209 is when, upon recommencing fuel supply and spark in the step 206 to start combustion, the machine 22 via the clutch 18 assists the engine accelerate to the synchronization speed by providing torque. Otherwise in a normal start, the engine 14 accelerates to the synchronization speed without torque from the machine 22 in a step 210 prior to fully reengaging the clutch in the step 212.

After the step 212 full reengagement of the clutch 18, the engine 14 in a step 214 is providing torque to the powertrain 10. At the step 214 the engine restart routine is complete.

The step at which the engine restart routine 200 commences is a function of the step of the engine stop routine 100 where the engine restart request is made. If the engine restart request terminating the engine stop routine 100 and commencing the engine restart routine 200 was made at a step 124, after engine 14 shutdown, then the restart routine 200 is commenced at the self recovery determination in the step 202. Otherwise, if the engine restart request terminating the engine stop routine 100 and commencing the engine restart routine 200 was made at step 120, while the engine 14 was at the idle speed, then the restart routine 200 is commenced at the fast start determination in the step 208. Alternatively, if the torque engine restart request terminating the engine stop routine 100 and commencing the engine restart routine 200 was made at a step 114, while the engine 14 was at the synchronized speed, then the restart routine 200 is commenced by fully reengaging the clutch at the step 212. Lastly, if the engine restart request terminating the engine stop routine 100 and commencing the engine restart routine 200 was made at a step 108, while the clutch 18 remained engaged, then the engine restart routine is commenced and completed at the step 214 with the engine 14 providing torque to the powertrain 10.

While certain embodiments of the present invention have been described in detail, those familiar with the art to which this invention relates will recognize various alternative designs and embodiments for practicing the invention as defined by the following claims.

What is claimed is:

1. A method of controlling a hybrid vehicle engine comprising:
   reducing torque in the engine as a clutch interposed between the engine and an electric machine remains engaged;
   disengaging the clutch before powering the engine at a speed synchronized to a speed of the machine;
   slowing the engine from the synchronized speed to an idle speed while the clutch remains disengaged;
   stopping the engine upon reaching the idle speed.

2. The method of claim 1 comprising the further steps of:
   restarting the stopped engine; and
   reengaging the clutch after the stopped engine is restarted and accelerated to the synchronized speed.

3. The method of claim 2 wherein the stopped engine is restarted while still rotating.

4. The method of claim 1 comprising the further steps of, upon receipt of an engine restart request prior to stopping the engine, immediately terminating unpowering the engine and resuming providing torque from the engine to a vehicle powertrain.

5. The method of claim 4 wherein the restart request is received prior to the clutch being disengaged.

6. The method of claim 4 comprising the further step of reengaging the clutch after the engine restart request is received, wherein the engine restart request is received after the clutch is disengaged but prior to the engine being slowed to the idle speed.

7. The method of claim 4 comprising the further step of the clutch being reengaged after the engine restart request is received, wherein the engine restart request is received after the engine is rotated at the synchronized speed but prior to the engine being stopped.

8. The method of claim 7 comprising the further step of the rotating engine being reaccelerated to the synchronized speed prior to reengaging the clutch.

9. A method of controlling a hybrid vehicle engine comprising:
   reducing torque in the engine as a clutch interposed between the engine and an electric machine remains engaged, the reduced torque being maintained for a first duration;
   disengaging the clutch, after the first duration and without stopping rotation of the engine, before powering the engine for a second duration at a speed synchronized to a speed of the machine;
   slowing and continuing to rotate the engine from the synchronized speed to an idle speed, after the second duration, while the clutch remains disengaged, the idle speed being maintained for a third duration;
   stopping the engine after the third duration;
   restarting the stopped engine.

10. A method of controlling a hybrid vehicle engine comprising:
   unpowering the engine, further comprising:
      reducing torque in the engine as a clutch interposed between the engine and an electric machine remains engaged;
      disengaging the clutch, without stopping rotation of the engine, before powering the engine at a speed synchronized to a speed of the machine;
      slowing and continuing to rotate the engine from the synchronized speed to an idle speed while the clutch remains disengaged; and
      stopping the engine upon reaching the idle speed;
   repowering the unpowered and stopped engine, further comprising:
      restarting and accelerating the stopped engine;
      fully reengaging the clutch once the restarted engine reaches the synchronized speed; and
      providing torque from the restarted engine via the reengaged clutch to a powertrain.

11. The method of claim 10 wherein the stopped engine is restarted while still rotating.

12. The method of claim 10 comprising the further steps of, upon receipt of an engine restart request prior to stopping the engine, immediately terminating unpowering the engine and resuming providing torque from the engine to the powertrain.

13. The method of claim 12 wherein the engine restart request is received prior to the clutch being disengaged.

14. The method of claim 12 comprising the further step of reengaging the clutch after the engine restart request is received, wherein the engine restart request is received after the clutch is disengaged but prior to the engine being slowed to the idle speed.

15. The method of claim 12 comprising the further step of the clutch being reengaged after the engine restart request is received, wherein the engine restart request is received after the engine is rotated at the idle speed but prior to the engine being stopped.

16. The method of claim 15 comprising the further step of the rotating engine self-accelerating to the synchronized speed prior to fully reengaging the clutch.

17. The method of claim 15 comprising the further step of the machine, via the clutch, accelerating the rotating engine to the synchronized speed prior to fully reengaging the clutch.

18. The method of claim 15 comprising the further step of cranking the engine.

* * * * *